(12) United States Patent
Kahara

(10) Patent No.: US 6,857,335 B2
(45) Date of Patent: Feb. 22, 2005

(54) SHIFT DEVICE

(75) Inventor: Keiji Kahara, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 152 days.

(21) Appl. No.: 10/218,766

(22) Filed: Aug. 14, 2002

(65) Prior Publication Data

US 2004/0031346 A1 Feb. 19, 2004

(51) Int. Cl.[7] ................ B60K 20/00; B60K 17/04; G05G 13/00; G05G 9/00
(52) U.S. Cl. ............... 74/473.33; 74/471 XY; 74/473.12; 74/473.1; 74/473.18; 74/523
(58) Field of Search ............ 74/471 XY, 473.1, 74/473.12, 473.18, 473.21, 473.28, 473.33, 490.14, 523, 335

(56) References Cited

U.S. PATENT DOCUMENTS

| | | | | |
|---|---|---|---|---|
| 5,689,996 A | * | 11/1997 | Ersoy ........................... 74/335 |
| 5,809,835 A | * | 9/1998 | Beim et al. ................... 74/335 |
| 5,845,535 A | * | 12/1998 | Wakabayashi et al. ... 74/473.18 |
| 5,899,115 A | * | 5/1999 | Kataumi et al. ......... 74/473.18 |
| 5,913,935 A | * | 6/1999 | Anderson et al. ............. 74/335 |
| 6,148,686 A | * | 11/2000 | Kataumi ................... 74/473.18 |
| 6,209,410 B1 | * | 4/2001 | Suzuki ..................... 74/473.18 |
| 6,237,435 B1 | * | 5/2001 | Gronhage et al. ...... 74/471 XY |
| 6,598,494 B1 | * | 7/2003 | Giefer ..................... 74/473.18 |

* cited by examiner

*Primary Examiner*—David A. Bucci
*Assistant Examiner*—Colby Hansen
(74) *Attorney, Agent, or Firm*—Boyle Fredrickson Newholm Stein & Gratz S.C.

(57) ABSTRACT

A manipulation lever can be manipulated to select a first mode for automatically changing the drive range of an automatic transmission or a second mode for changing the drive range by manually manipulating the manipulation lever. The manipulation lever is shifted between the first mode in which a control lever moves mechanically with the manipulation lever and the second mode in which the control lever does not move with the manipulation lever. A first guide portion guides the manipulation lever and a second guide portion guides the clutch lever. When the manipulation lever is arranged at the drive position, the first and second guide portions permit the manipulation lever to be disengaged from the clutch lever. When the manipulation lever is arranged at positions other than the drive position, the first and second guide portions keep the manipulation lever to be engaged with the clutch lever.

20 Claims, 8 Drawing Sheets

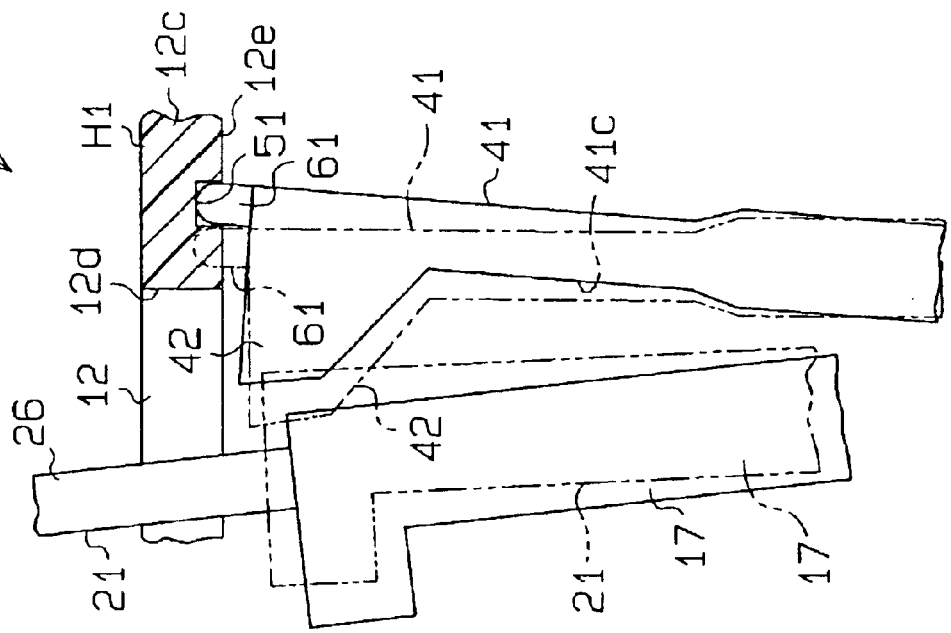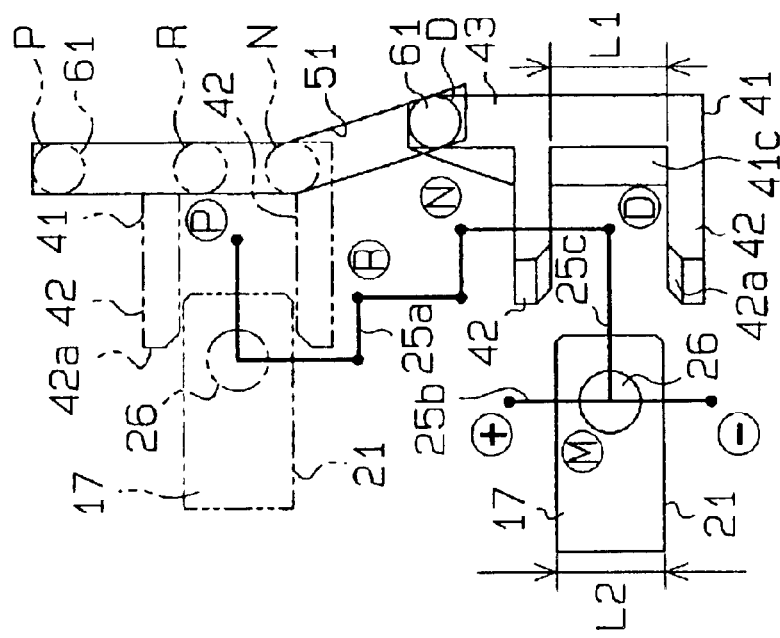

SHIFT DEVICE

BACKGROUND OF THE INVENTION

The present invention relates to a shift device. More specifically, the present invention pertains to a shifting mechanism of a shift device with a manual mode.

To meet diversifying needs, several functions have been added to shift devices provided in vehicular automatic transmissions. For example, a shift device with a manual mode that has a manual transmission function has been proposed.

The manual mode in this specification refers to a mode for allowing a driver to select one of a number of drive positions such as the first, second, and third gear by manipulating the manipulation lever. When the manual mode is selected, the automatic transmission does not shift the transmission automatically based on the vehicle speed and a driver can shift up or down gears by manipulating the manipulation lever.

As shown in FIGS. 9(a) and 9(b), a shift device 71 with a manual mode has a casing 72. The casing 72 accommodates a manipulation lever 73, a control lever 74, and a clutch lever 75. The manipulation lever 73 changes the shift position of a vehicular automatic transmission. The control lever 74 transmits the motion of the manipulation lever 73 to the automatic transmission. When the clutch lever 75 is engaged with the manipulation lever 73, the control lever 74 mechanically moves with the manipulation lever 73. When the clutch lever 75 is disengaged from the manipulation lever 73, the control lever 74 does not move with the manipulation lever 73.

When the manipulation lever 73 is located at one of a parking position (P), a reverse position (R), a neutral position (N), and a drive position (D) in an automatic mode, the control lever 74 mechanically moves with the manipulation lever 73. When a driver shifts the manipulation lever 73 to a manual mode position as shown by a solid line in FIG. 9(a), the clutch lever 75 is disengaged from the manipulation lever 73. As a result, the control lever 74 does not mechanically move with the motion of the manipulation lever 73. In this state, when the manipulation lever 73 is manipulated among a positive position, an M (manual) position, or a negative position, the motion of the manipulation lever 73 is transmitted to the automatic transmission by electric signals.

When the shift mode is switched from the automatic mode to the manual mode, the clutch lever 75 must be completely disengaged from the manipulation lever 73. If the clutch lever 75 is not completely disengaged from the manipulation lever 73, the control lever 74 mechanically moves with the manipulation lever 73 even when the manual mode is selected. In this case, it is difficult to determine whether the shift position is changed to the positive position or to the neutral position (N position).

A chain double-dashed line in FIG. 9(a) illustrates the manipulation lever 73 being engaged with the clutch lever 75. A solid line in FIG. 9(a) illustrates the manipulation lever 73 being disengaged from the clutch lever 75. In the prior art device, to solve the above problem, the distance C1 between the engaged position and the disengaged position must be great as shown in FIG. 9(a), so that the clutch lever 75 and the manipulation lever 73 are reliably disengaged from each other. Thus, the setting of the shift pattern was restricted.

SUMMARY OF THE INVENTION

Accordingly, it is an objective of the present invention to provide a shift device that adds to the flexibility of the design of a shift pattern.

To achieve the above objective, the present invention provides a shift device for manipulating a vehicular automatic transmission. The device includes a casing, a manipulation lever, a control lever, a clutch lever, a first guide portion, and a second guide portion. The manipulation lever projects from the casing and moves among a plurality of shift positions. When the manipulation lever is selectively arranged at a predetermined shift position, the manipulation lever may be manipulated to select a first mode, in which the drive range of the automatic transmission is automatically changed, or a second mode, in which the drive range of the automatic transmission is changed by manipulating the manipulation lever. The control lever is arranged in the casing and transmits the motion of the manipulation lever to the automatic transmission. The clutch lever is arranged in the casing and moves integrally with the control lever. When the first mode is selected, the manipulation lever engages with the clutch lever such that the control lever moves mechanically with the manipulation lever. When the second mode is selected, the clutch lever disengages from the manipulation lever such that the control lever does not move with the manipulation lever. The first guide portion guides the manipulation lever. The second guide portion guides the clutch lever. When the manipulation lever is arranged at the predetermined shift position, the first guide portion and the second guide portion permit the manipulation lever to be disengaged from the clutch lever. When the manipulation lever is arranged at positions other than the predetermined shift position, the first guide portion and the second guide portion keep the manipulation lever to be engaged with the clutch lever.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 5(a) and 5(b) are diagrams explaining the operation of the clutch lever;

DETAILED DESCRIPTION OF THE PREFERRED EMBODIMENTS

A first embodiment of the present invention will now be described with reference to FIGS. 1 to 7. In the first embodiment, the present invention is embodied in a shift device used in an automobile.

Figure 1:
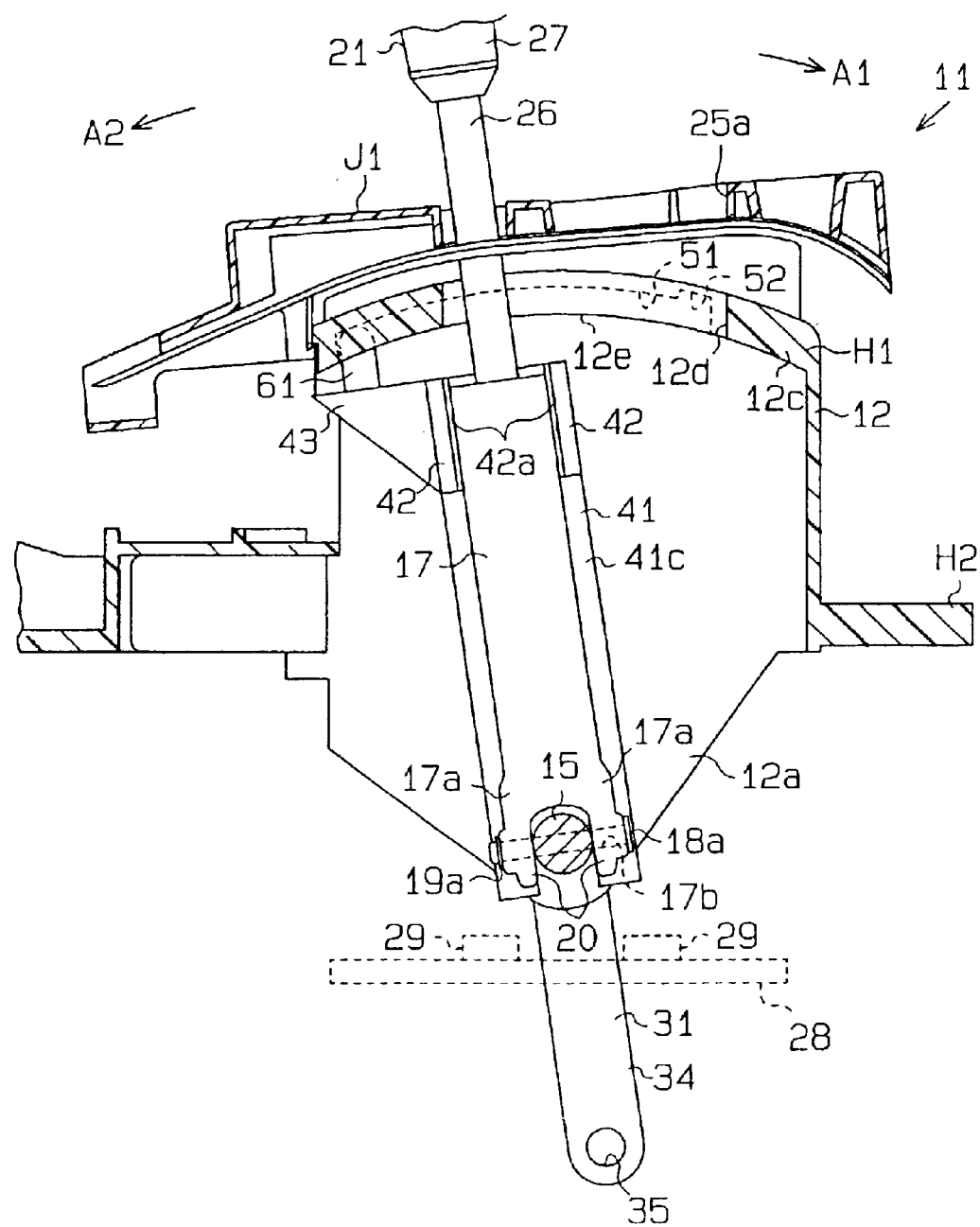
FIG. 1 is a partial cross-sectional front view illustrating a shift device with a manual mode according to a first embodiment of the present invention.
Figure 2:
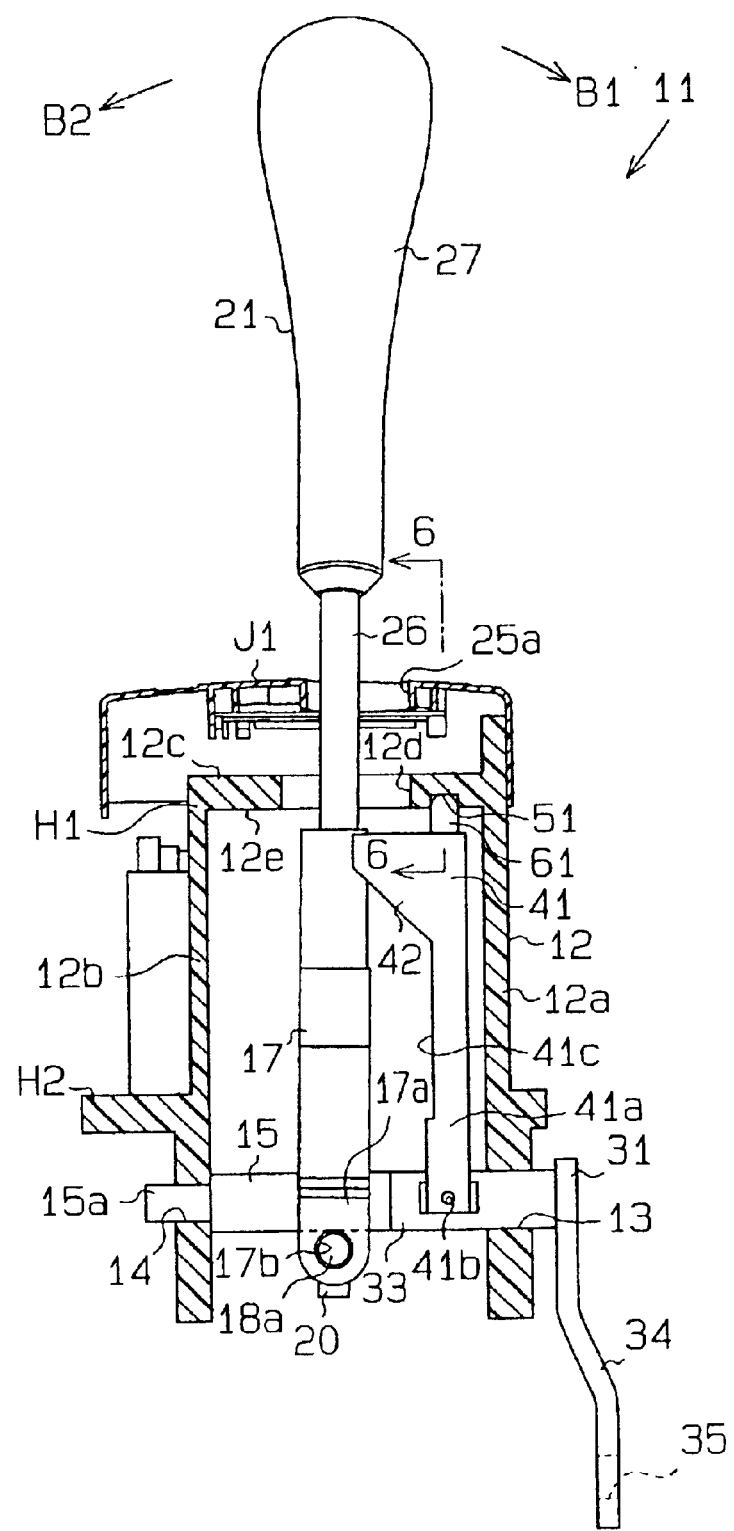
FIG. 2 is a partial cross-sectional side view of the shift device.

FIGS. 1 and 2 show a shift device 11 having a manual mode. A casing 12, which constitutes a part of the shift device 11, is located on the floor of a vehicle (not shown). The casing 12 is formed integrally with a base H2 and a housing H1, which are made of synthetic resin.

Figure 3:
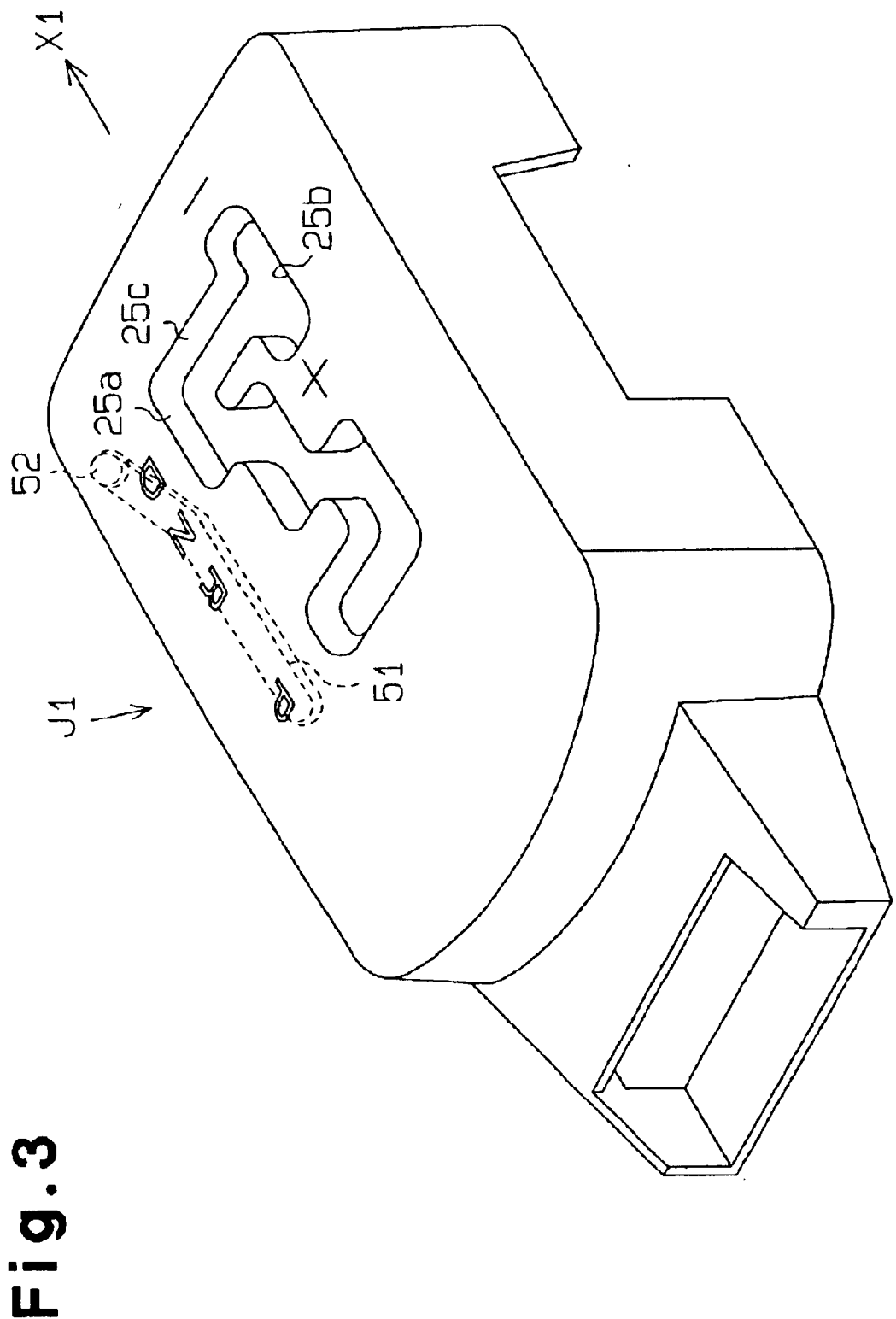
FIG. 3 is a perspective view of the cover.

The housing H1 has a ceiling 12c, in which a rod groove 12d is formed. A cover J1 made of synthetic resin is secured on top of the housing H1. As shown in FIG. 3, the cover J1 has a first guide groove 25a, which has several flections. Each flection corresponds to one of shift positions, which include a parking position P, a reverse position R, a neutral position N, and a drive position D of a first mode. A second guide groove 25b is formed in the cover J1 extending in a direction represented by an arrow X1. The second guide groove 25b is arranged next to the first guide groove 25a extending straight.

Each of the two ends of the second guide groove 25b corresponds to one of an acceleration position (positive position) and a deceleration position (negative position) of a second mode, which is a manual mode. The middle portion of the second guide groove 25b is connected to the drive position of the first guide groove 25a by a coupling portion 25c.

As shown in FIG. 1, a base plate 28 is arranged below the casing 12. Two magnetism-detecting elements 29, which are formed of magnetic resistance elements, are located on the top surface of the base plate 28. The magnetism-detecting elements 29 detect the shift position of a manipulation lever 21. In the preferred embodiment, the magnetism-detecting elements 29 detect the shift position of the manipulation lever 21 in the second mode (manual mode).

As shown in FIGS. 1 and 2, the casing 12 has a first side wall 12a and a second side wall 12b. The lower end of the first and second side walls 12a, 12b are located lower than the lower surface of the base H2. As shown in FIG. 2, a first through hole 13 is formed in the first side wall 12a and a second through hole 14 is formed in the second side wall 12b.

Figure 4:
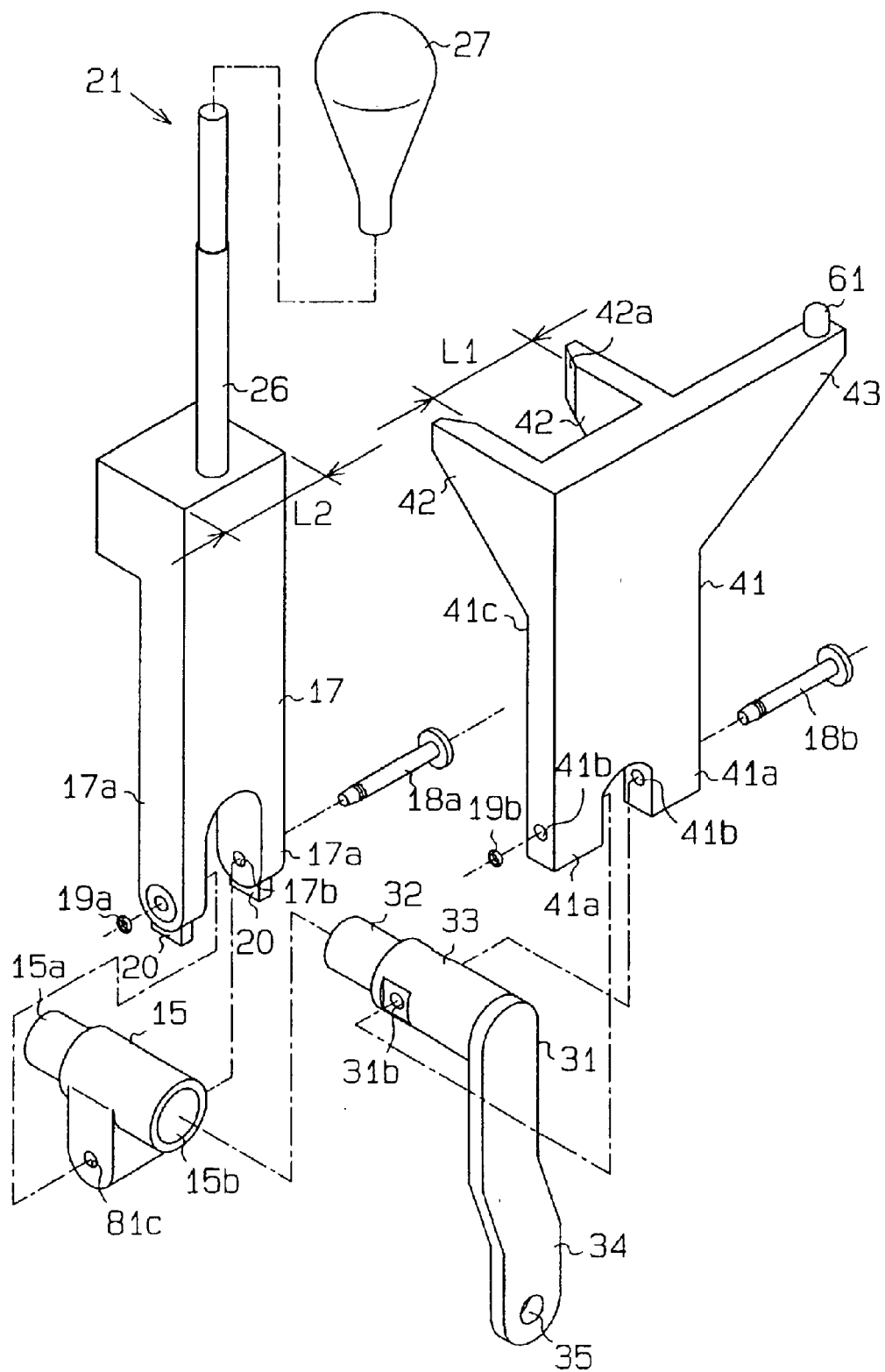
FIG. 4 is an exploded perspective view illustrating the manipulation lever and the clutch lever.

An inserting portion 15a of a retainer 15 is inserted in the second through hole 14. As shown in FIG. 4, a fitting bore 15b is formed in the end of the retainer 15 opposite to the end that includes the inserting portion 15a. A first pin hole 81c is located at the longitudinal center of the retainer 15.

As shown in FIGS. 1 and 2, a part of the manipulation lever 21 is accommodated in the casing 12. The manipulation lever 21 changes the shift range of the vehicular automatic transmission, which is not shown, between the first mode (auto mode) and the second mode (manual mode).

The manipulation lever 21 includes a lever 17, the distal end of which is secured to a rod 26. The rod 26 projects from the upper surface of the cover J1 through the rod groove 12d and the first and second guide grooves 25a, 25b. A knob 27 is detachably secured to the distal end of the rod 26.

As shown in FIG. 4, a fork, which has two prongs 17a, is formed at the proximal end of the lever 17. A magnet 20 is secured to the lower surface of each prong 17a. The magnets 20 are arranged to face the base plate 28. When the manipulation lever 21 is shifted to the positive position, the magnets 20 turn on the one of the magnetism-detecting elements 29 that is arranged rightward as viewed in FIG. 1. When the manipulation lever 21 is shifted to the negative position, the magnets 20 turn on the one of the magnetism-detecting elements 29 that is arranged leftward as viewed in FIG. 1. Each magnetism-detecting element 29 sends an electric signal that corresponds to the shift position of the manipulation lever 21 to the automatic transmission. The magnets 20 and the magnetism-detecting elements 29 function as a detecting device.

Another first pin hole 17b is formed in each prong 17a. A first pin 18a is inserted through the first pin holes 17b, 81c while holding the retainer 15 by the prongs 17a. A nut 19a is fitted to the distal end of the first pin 18a to rotatably support the manipulation lever 21 about the retainer 15. Therefore, the manipulation lever 21 is rotated about the retainer 15 in the directions represented by arrows A1 and A2 shown in FIG. 1 and about the first pin 18a in the directions represented by arrows B1 and B2 shown in FIG. 2.

As shown in FIG. 2, a large diameter shaft 33 of a control lever 31 is inserted in the first through hole 13. The control lever 31 transmits the motion of the manipulation lever 21 to the automatic transmission. The control lever 31 is normally used in FR (front-engine rear-drive) vehicles. As shown in FIG. 4, a small diameter shaft 32 is formed on one end of the control lever 31.

The small diameter shaft 32 is inserted in the fitting bore 15b of the retainer 15. The small diameter shaft 32 can be rotated with respect to the retainer 15. A rotational piece 34 is arranged on the other end of the control lever 31. The rotational piece 34 is connected to the automatic transmission by a rod, which is not shown. A through hole 35 is formed in the distal end of the rotational piece 34. A pin (not shown) is inserted in the through hole 35 and a hole formed in the rod such that the rod is rotatably attached to the distal end of the rotational piece 34. A second pin hole 31b is arranged in the vicinity of the small diameter shaft 32 of the control lever 31.

As shown in FIGS. 1 and 2, a clutch lever 41 is accommodated in the casing 12. A holding portion, which has two branches 41a, is formed at the proximal end of the clutch lever 41. A second pin hole 41b is formed in each branch 41a. A second pin 18b (see FIG. 4) is inserted through the second pin holes 41b, 31b while branches 41a are holding the large diameter shaft 33 of the control lever 31. A nut 19b (see FIG. 4) is fitted to the distal end of the second pin 18b to rotatably support the clutch lever 41 about the control lever 31. Therefore, the clutch lever 41 is rotated about the large diameter shaft 33 in the directions represented by the arrows A1 and A2 shown in FIG. 1 and about the second pin 18b in the directions represented by the arrows B1 and B2 shown in FIG. 2.

As shown in FIG. 4, two angular arms 42 are located at the upper portion of the side wall 41c of the clutch lever 41. The arms 42 are arranged on the lateral edges of the clutch lever 41. The distance L1 between the proximal portions of the arms 42 is slightly larger than the width L2 of the lever 17. Therefore, the arms 42 can be selectively engaged with and disengaged from the lever 17. Each arm 42 has a tapered portion 42a at its distal end. Thus, the distance between the arms 42 gradually increases from the proximal end toward the distal end. The distance between the distal ends of the arms is larger than the distance L1 between the proximal end of the arms.

Figure 6:
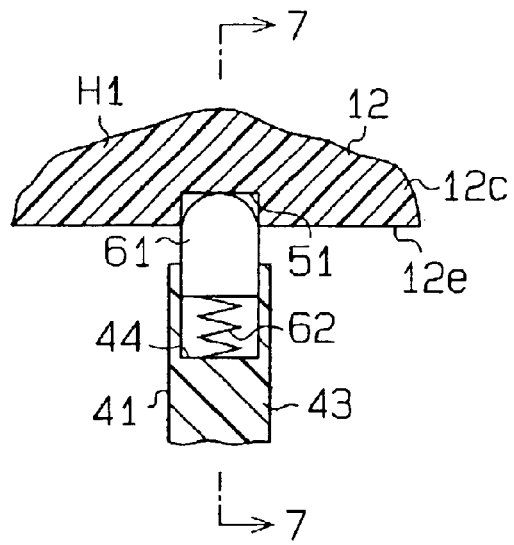
FIG. 6 is an enlarged cross-sectional view taken along line 6—6 in FIG. 2.
Figure 7:
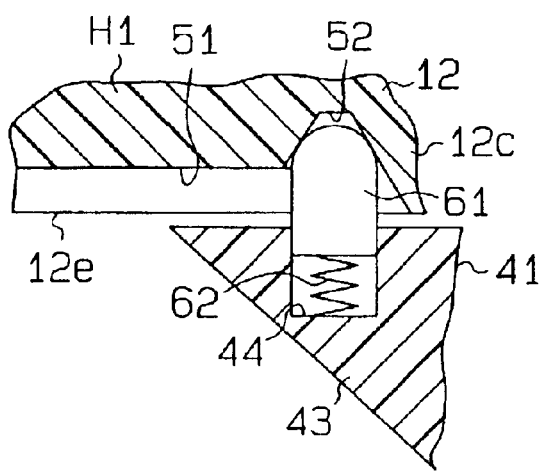
FIG. 7 is a cross-sectional view taken substantially along line 7—7 shown in FIG. 6 illustrating the engaging pin being engaged with a recess.

An angular projection 43 extends from the distal end of the clutch lever 41. The projection 43 is flush with the side wall 41c of the clutch lever 41. The projection 43 is arranged to be perpendicular to the arms 42. As shown in FIGS. 6 and 7, a recess 44 is formed at the distal end of the upper surface of the projection 43. The recess 44 accommodates a guided portion, which is an engaging pin 61. The engaging pin 61 moves vertically. The engaging pin 61 is substantially cylindrical and has a hemispheric distal end. An elastic member, which is a spring 62 in this embodiment, is located between the lower surface of the engaging pin 61 and the bottom surface of the recess 44. The spring 62 urges the engaging pin 61 upward as viewed in FIGS. 6 and 7.

The clutch lever 41 is shifted between a state where the control lever 31 mechanically moves with the manipulation lever 21 and a state where the control lever 31 does not move with the manipulation lever 21 as the clutch lever 41 is engaged with or disengaged from the lever 17. More specifically, as shown by a chain double-dashed line in FIGS. 5(a) and 5(b), when the manipulation lever 21 is arranged at one of the parking position, the reverse position, the neutral position, and the drive position, the clutch lever 41 is engaged with the manipulation lever 21. In this case, the control lever 31 mechanically moves with the manipulation lever 21.

On the other hand, when the manipulation lever 21 is moved along the coupling portion 25c leftward as viewed in FIG. 5(b) while being arranged at the drive position D, the clutch lever 41 is disengaged from the manipulation lever 21 as shown by a solid line shown in FIGS. 5(a) and 5(b). In this state, the control lever 31 does not mechanically move with the manipulation lever 21. When the manipulation lever 21 is manipulated, the motion of the manipulation lever 21 is electrically transmitted to the automatic transmission by the magnetism-detecting elements 29.

As shown in FIGS. 1 to 3, a guide groove 51, which is bent at an obtuse angle, is formed on the back surface 12e of the ceiling 12c. The guide groove 51 is arranged next to the rod groove 12d. The width of the guide groove 51 is slightly larger than the outer diameter of the engaging pin 61 to permit the engaging pin 61 to be accommodated in the guide groove 51. The engaging pin 61 is urged against the inner top surface of the guide groove 51 by the force of the spring 62. The guide groove 51 guides the engaging pin 61 when the clutch lever 41 is moved.

As shown in FIG. 7, an engaging recess 52 is formed in the guide groove 51 at a portion corresponding to the drive position D. The engaging recess 52 is engaged with the engaging pin 61 when the manipulation lever 21 is at the drive range.

The engaging recess 52 prevents the clutch lever 41 from being displaced by vibration while the shift mode is being shifted to the second mode (manual mode). The engaging recess 52 permits the manipulation lever 21 to be reliably engaged with the clutch lever 41 when the manipulation lever 21 is restored from the second mode (manual mode) to the drive position D of the first mode (auto mode). The engaging recess 52 has a circular cross-section. The inner diameter of the engaging recess 52 increases toward the opening. The engaging recess 52 is deeper than the guide groove 51 and is arranged such that the distal portion of the engaging pin 61 can be inserted.

As shown in FIGS. 5(a) and 5(b), the guide groove 51 extends straight and parallel to the arrow X1 shown in FIG. 3 at a portion where the engaging pin 61 correspond to the parking position P to the neutral position N. The guide groove 51 is arranged such that the clutch lever 41 is engaged with the manipulation lever 21 when the manipulation lever 21 is located between the parking position P and the drive position D. The guide groove 51 is bent at a portion corresponding to the neutral position N and extends to a position corresponding to the drive position D. The guide groove 51 is inclined such that the guide groove 51 gradually separates from the first guide groove 25a at a portion corresponding to the neutral position N to the drive position D. Therefore, when the manipulation lever 21 is shifted from the neutral position N to the drive position D, the guide groove 51 separates the clutch lever 41 from the manipulation lever 21 to minimize the engagement degree. Further, the guide groove 51 disengages the clutch lever 41 from the manipulation lever 21 when the shift mode is shifted from the first mode (auto mode) to the second mode (manual mode) while the manipulation lever 21 is arranged at the drive position.

The operation of the shift device 11 with a manual mode will now be described.

When the manipulation lever 21 is shifted from the parking position P to the neutral position N, the manipulation lever 21 moves along the first guide groove 25a and the clutch lever 41 moves along the guide groove 51. The clutch lever 41 is engaged with the manipulation lever 21 while being moved. Therefore, the control lever 31 moves mechanically with the manipulation lever 21. Thus, when the shift position is changed, the motion of the manipulation lever 21 is transmitted to the automatic transmission by the clutch lever 41 and the control lever 31. Accordingly, the gear is shifted in the automatic transmission.

When the manipulation lever 21 is shifted from the neutral position N to the drive position D, the engaging pin 61 gradually moves away from the manipulation lever 21 along the guide groove 51. As a result, the length of engaging portion between the manipulation lever 21 and the clutch lever 41 decreases. When the manipulation lever 21 is moved to the drive position D, the engaging pin 61 engages with the engaging recess 52. When the vehicle continues to run while the manipulation lever 21 is arranged at the drive position D, the transmission is automatically shifted up or down in accordance with the vehicle speed.

On the other hand, when the manipulation lever 21 is arranged at the drive position D and is rotated in a direction denoted by B2 in FIG. 2, the shift mode is shifted from the first mode (auto mode) to the second mode (manual mode). When the shift mode is shifted to the second mode (manual mode), the manipulation lever 21 disengages from the clutch lever 41. As a result, the control lever 31 is arranged in a state where the control lever 31 does not move with the manipulation lever 21.

In this state, when the manipulation lever 21 is manipulated to the positive position or the negative position shown in FIG. 5(a), the motion of the manipulation lever 21 is detected by the corresponding magnetism-detecting element 29 and is electrically transmitted to the automatic transmission. Thus, the automatic transmission is shifted up or down in response to the manual manipulation of the manipulation lever 21.

The preferred embodiment provides the following advantages.

Figure 9A:
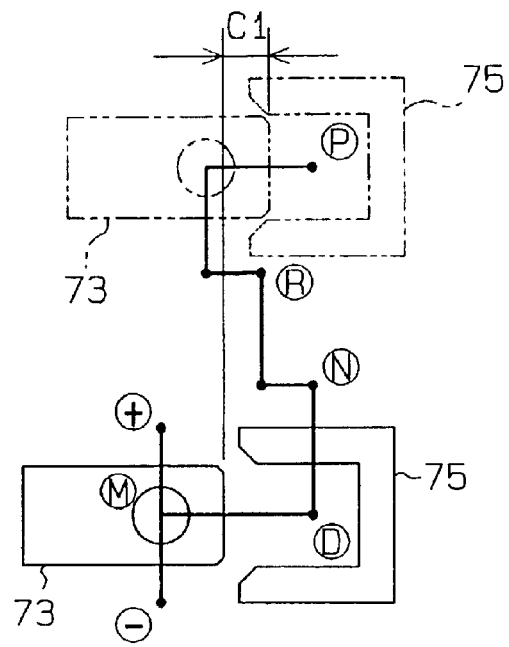
FIGS. 9(a) and 9(b) are diagrams illustrating the operation of a clutch lever of a shift device according to a prior art.
Figure 9B:
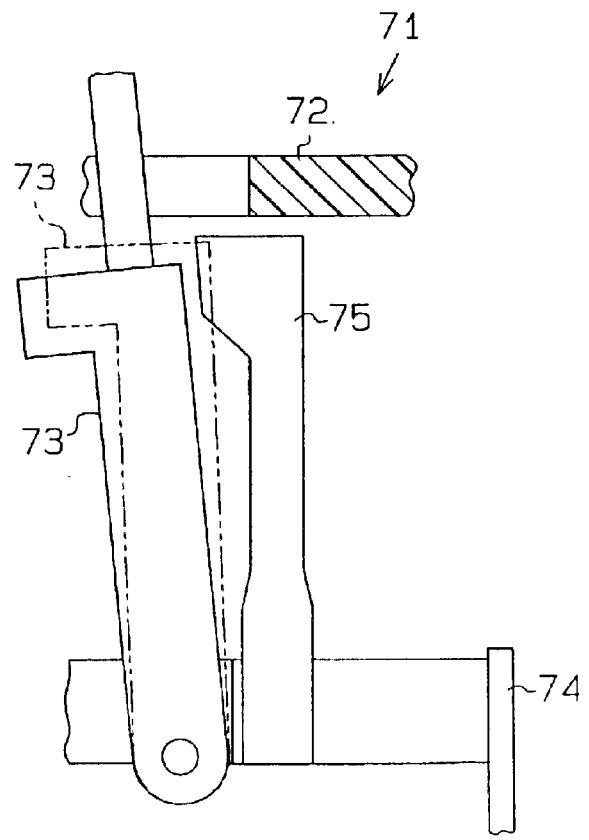

(1) The engaging pin 61 is guided along the guide groove 51 when the shift mode is shifted from the first mode (auto mode) to the second mode (manual mode) so that the clutch lever 41 is separated from the manipulation lever 21. Therefore, the clutch lever 41 is reliably disengaged from the manipulation lever 21 when the shift mode is shifted to the second mode (manual mode) regardless of the shift pattern. As a result, the control lever 31 is reliably brought into a state where the control lever 31 does not move mechanically with the manipulation lever 21. This adds to the flexibility of the shift pattern regardless of the length of the distance C1 shown in FIG. 9(a).

(2) The spring 62 urges the engaging pin 61 toward the guide groove 51. This prevents a space from being formed between the engaging pin 61 and the guide groove 51. Therefore, the engaging pin 61 is prevented from being held loosely and generating noise.

(3) The engaging pin 61 is engaged with the engaging recess 52 formed in the guide groove 51. The engaging recess 52 reliably holds the clutch lever 41 at a predetermined position. This prevents the clutch lever 41 from being displaced by vibration when the shift position is in the second mode (manual mode) and the control lever 31 does not move with the manipulation lever 21. Therefore, the clutch lever 41 and the control lever 31 are prevented from accidentally moving by vibration to shift the automatic transmission to a shift range that a driver does not intend. The manipulation lever 21 is also reliably engaged with the clutch lever 41 when the shift mode is restored from the second mode to the first mode.

(4) The engaging pin 61 is engaged with the engaging recess 52 formed in the guide groove 51. Therefore, a separate part is not required to secure the clutch lever 41 and the control lever 31 to the engaging recess 52. This reduces the cost for manufacturing the shift device 11 with a manual mode.

(5) Each arm 42 includes the tapered portion 42a at its distal end. Therefore, even when the clutch lever 41 is displaced and causes the lever 17 of the manipulation lever 21 to contact the arm 42 when restoring the manipulation lever 21 from the second mode (manual mode) to the first mode (auto mode), the lever 17 is guided between the arms 42 by the tapered portion 42a. Therefore, the manipulation lever 21 is reliably engaged with the clutch lever 41.

It should be apparent to those skilled in the art that the present invention may be embodied in many other specific forms without departing from the spirit or scope of the invention. Particularly, it should be understood that the invention may be embodied in the following forms.

Figure 8A:
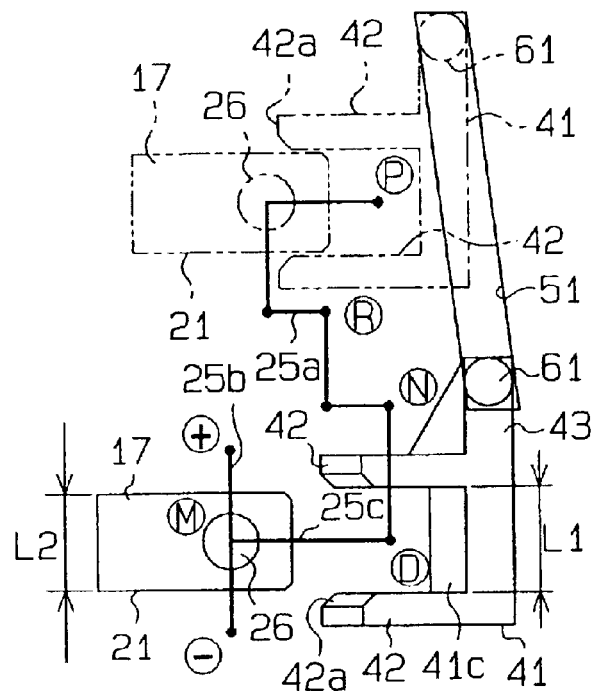
FIGS. 8(a) and 8(b) are diagrams illustrating a guide groove according to a further embodiment.

The guide groove 51 may be arranged such that the clutch lever 41 gradually moves away from the manipulation lever 21 as the shift position is varied from the parking position, the reverse position, the neutral position, and the drive position in this order. For example, the guide groove 51 may be a straight line as shown in FIG. 8(a).

Figure 8B:
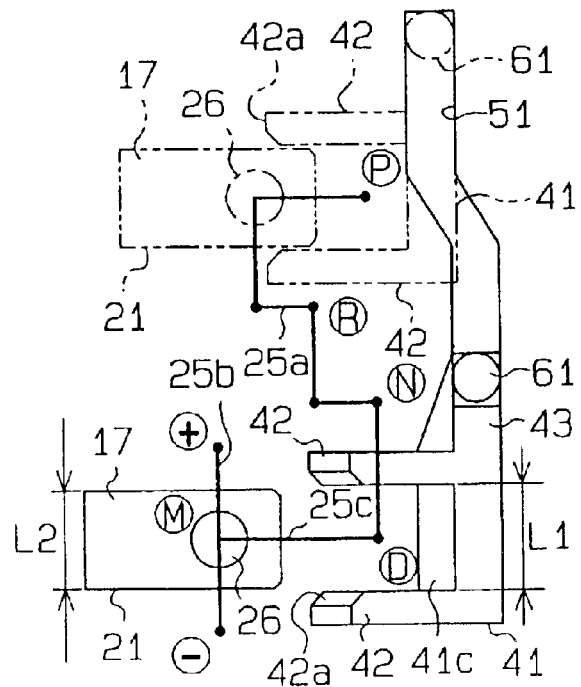

The guide groove 51 may be arranged such that the clutch lever 41 moves away from the manipulation lever 21 when the shift position is changed from the reverse position to the neutral position. For example, as shown in FIG. 8(b), the guide groove 51 may be bent at a portion corresponding to the reverse position and the neutral position such that the guide groove 51 gradually extends away from the first guide groove 25a.

In the preferred embodiment, the guide groove 51 is provided as the guide portion and the engaging pin 61 is provided as the guided portion. However, other member may be used as the guide portion and the guided portion. For example, a metal plate formed of magnetic body may be used as the guide portion and a magnet may be used as the guided portion. In this case, the guided portion is guided by the magnetic attraction force generated between the metal plate and the magnet.

In the preferred embodiment, the engaging pin 61 is arranged on the clutch lever 41 and the guide groove 51 is formed in the back surface 12e of the ceiling 12c. However, a groove may be formed in the clutch lever 41 and a projection may be arranged on the back surface 12e.

In the preferred embodiment, the engaging recess 52 is arranged in the guide groove 51. However, an engaging projection may be arranged on the inner side surface of the guide groove 51. In this case, the engaging pin 61 engages with the engaging projection when the shift range is in the drive position.

In the preferred embodiment, the elastic member, which is the spring 62, is arranged between the lower surface of the engaging pin 61 and the bottom surface of the recess 44. However, other material such as rubber may be used as the elastic member instead of the spring 62. Further, the elastic member such as the spring 62 need not be provided.

Therefore, the present examples and embodiments are to be considered as illustrative and not restrictive and the invention is not to be limited to the details given herein, but may be modified within the scope and equivalence of the appended claims.

What is claimed is:

1. shift device for manipulating a vehicular automatic transmission, the device comprising:

a casing;

a manipulation lever, which projects from the casing, wherein the manipulation lever is rotatably supported about a first axis and a second axis perpendicular to the first axis to move among a plurality of shift positions, wherein, when the manipulation lever is selectively arranged at a predetermined shift position, the manipulation lever is manipulated to select a first mode, in which the drive range of the automatic transmission is automatically changed, or a second mode, in which the drive range of the automatic transmission is changed by manipulating the manipulation lever;

a control lever arranged in the casing, wherein the control lever transmits the motion of the manipulation lever to the automatic transmission;

a clutch lever arranged in the casing, wherein the clutch lever moves integrally with the control lever, the clutch lever being supported rotatably about said first axis and rotatably about a third axis perpendicular to the first axis and parallel with the second axis, and wherein, when the first mode is selected, the manipulation lever engages with the clutch lever such that the control lever moves mechanically with the manipulation lever, and when the second mode is selected, the clutch lever disengages from the manipulation lever such that the control lever does not move with the manipulation lever;

a first guide portion for guiding the manipulation lever; and a second guide portion for guiding the clutch lever, wherein, when the manipulation lever is arranged at the predetermined shift position, the first guide portion and the second guide portion permit the manipulation lever to be disengaged from the clutch lever by allowing the rotation of the clutch lever about the third axis, and wherein, when the manipulation lever is arranged at positions other than the predetermined shift position, the first guide portion and the second guide portion keep the manipulation lever to be engaged with the clutch lever while allowing the rotation of the manipulation lever and the clutch lever about the first axis.

2. The shift device according to claim 1, further comprising a cover for covering the casing, wherein the first guide portion is a first groove formed in the cover, and the manipulation lever projects from the cover through the first groove, and wherein the first groove includes deflections corresponding to a plurality of shift positions of the manipulation lever.

3. The shift device according to claim 2, wherein the plurality of shift positions include a parking position, a reverse position, a neutral position, and a drive position, wherein the predetermined shift position is the drive position.

4. The shift device according to claim 3, wherein, when the manipulation lever is arranged at the drive position and moved away from the second guide portion, the manipulation lever disengages from the clutch lever.

5. The shift device according to claim 3, wherein the second guide portion is a second groove formed in the casing, and wherein the clutch lever includes a pin, which is engaged with the second groove and moves along the second groove.

6. The shift device according to claim 5, further comprising an elastic member that urges the pin toward the second groove.

7. The shift device according to claim 3, wherein when the manipulation lever moves from the parking position to the drive position in response to the movement of the manipulation lever, the clutch lever rotates about the third axis to move away from the manipulation lever.

8. The shift device according to claim 1, wherein the second guide portion is formed in the casing adjacent to the first guide portion.

9. The shift device according to claim 1, further comprising a detecting device for detecting the manipulation position of the manipulation lever when the manipulation lever is arranged in the second mode and is manipulated.

10. The shift device according to claim 9, wherein the detecting device includes a pair of magnets, which is arranged on the manipulation lever apart from each other by a predetermined distance, and a pair of magnetism-detecting elements arranged in the casing apart from each other by a predetermined distance corresponding to each magnet, wherein, when the magnets approach the magnetism-detecting elements, the magnetism-detecting elements detect the magnets and are turned on and send a predetermined signal to the automatic transmission.

11. A shift device for manipulating a vehicular automatic transmission, the device comprising:
   a casing;
   a manipulation lever, which projects from the casing, wherein the manipulation lever is rotatably supported about a first axis and a second axis perpendicular to the first axis to move among a plurality of shift positions, which include a parking position, a reverse position, a neutral position, and a drive position, wherein, when the manipulation lever is selectively arranged at a drive position, the manipulation lever is manipulated to select an automatic mode, in which the drive range of the automatic transmission is automatically changed, or a manual mode, in which the drive range of the automatic transmission is changed by manipulating the manipulation lever;
   a control lever arranged in the casing, wherein the control lever transmits the motion of the manipulation lever to the automatic transmission;
   a clutch lever arranged in the casing, wherein the clutch lever moves integrally with the control lever, the clutch lever being supported rotatably about said first axis and rotatably about a third axis perpendicular to the first axis and parallel with the second axis, and wherein, when the automatic mode is selected, the manipulation lever engages with the clutch lever such that the control lever moves mechanically with the manipulation lever, and, when the manual mode is selected, the clutch lever disengages from the manipulation lever such that the control lever does not move with the manipulation lever;
   a first guide portion for guiding the manipulation lever; and
   a second guide portion for guiding the clutch lever,
   wherein, when the manipulation lever is arranged at the predetermined shift position, the first guide portion and the second guide portion permit the manipulation lever to be disengaged from the clutch lever by allowing the rotation of the clutch lever about the third axis, and wherein, when the manipulation lever is arranged at positions other than the drive position, the first guide portion and the second guide portion keep the manipulation lever to be engaged with the clutch lever while allowing the rotation of the manipulation lever and the clutch lever about the first axis.

12. The shift device according to claim 11, further comprising a cover for covering the casing, wherein the first guide portion is a first groove formed in the cover, and the manipulation lever projects from the cover through the first groove, and wherein the first groove includes flections corresponding to a plurality of shift positions of the manipulation lever.

13. The shift device according to claim 11, wherein the second guide portion is formed in the casing adjacent to the first guide portion.

14. The shift device according to claim 13, wherein, when the manipulation lever is arranged at the drive position and moved away from the second guide portion, the manipulation lever disengages from the clutch lever.

15. The shift device according to claim 14, wherein the second guide portion is a second groove formed in the casing, and wherein the clutch lever includes a pin, which is engaged with the second groove and moves along the second groove.

16. The shift device according to claim 15, further comprising an elastic member that urges the pin toward the second groove.

17. The shift device according to claim 11, further comprising a detecting device for detecting the manipulation position of the manipulation lever when the manipulation lever is arranged in the second mode and is manipulated.

18. The shift device according to claim 17, wherein the detecting device includes a pair of magnet, which is arranged on the manipulation lever apart from each other by a predetermined distance, and a pair of magnetism-detecting element arranged in the casing apart from each other by a predetermined distance corresponding to each magnet, wherein, when detecting the magnet that has approached, the magnetism-detecting element is turned on and sends a predetermined signal to the automatic transmission.

19. The shift device according to claim 11, wherein when the manipulation lever moves from the parking position to the drive position in response to the movement of the manipulation lever, the clutch lever rotates about the third axis to move away from the manipulation lever.

20. A shift device for manipulating a vehicular transmission, the device comprising:
   a manipulation lever, wherein the manipulation lever moves among a plurality of shift positions within a shift pattern that encompasses movement in a first axis and a second axis perpendicular to the first axis, wherein, when the manipulation lever is selectively arranged at a predetermined shift position, the manipulation lever is manipulated to select a first mode in which the drive range of the transmission is automatically changed, or a second mode, in which the drive range of the transmission is changed by manipulating the manipulation lever;

a control lever, wherein the control lever transmits the motion of the manipulation lever to the transmission;

a clutch lever, wherein the clutch lever moves integrally with the control lever, and wherein, when the first mode is selected, the manipulation lever engages with the clutch lever such that the control lever moves mechanically with the manipulation lever, and when the second mode is selected, the clutch lever disengages from the manipulation lever such that the control lever does not move with the manipulation lever;

a first guide portion for guiding the manipulation lever;

a second guide portion for guiding the clutch lever, wherein, when the manipulation lever is arranged at the predetermined shift position, the first guide portion and the second guide portion permit the manipulation lever to be disengaged from the clutch lever; and wherein, when the manipulation lever is arranged at positions other than the predetermined shift position, the first guide portion and the second guide portion keep the manipulation lever engaged with the clutch lever.

* * * * *